(12) United States Patent
Sato

(10) Patent No.: US 8,311,383 B2
(45) Date of Patent: Nov. 13, 2012

(54) RECEIVING APPARATUS, RECEIVING METHOD, RECORDING APPARATUS, RECORDING METHOD, PROGRAM, RECORDING MEDIUM, AND NETWORK SYSTEM

(75) Inventor: Masahiko Sato, Tokyo (JP)

(73) Assignee: Sony Corporation (JP)

(*) Notice: Subject to any disclaimer, the term of this patent is extended or adjusted under 35 U.S.C. 154(b) by 805 days.

(21) Appl. No.: 12/410,844

(22) Filed: Mar. 25, 2009

(65) Prior Publication Data

US 2009/0245751 A1  Oct. 1, 2009

(30) Foreign Application Priority Data

Mar. 28, 2008  (JP) ................. P2008-086709

(51) Int. Cl.
*H04N 5/935* (2006.01)
(52) U.S. Cl. ........ 386/213; 386/232; 386/239; 386/326; 386/E5.001
(58) Field of Classification Search .................. 386/232, 386/239, 326, E5.001
See application file for complete search history.

(56) References Cited

U.S. PATENT DOCUMENTS

2006/0002682 A1   1/2006   Kanamori

FOREIGN PATENT DOCUMENTS

| EP | 1 482 729 A2 | 12/2004 |
| EP | 1 679 909 A2 | 7/2006 |
| EP | 1 681 869 A1 | 7/2006 |
| EP | 1 761 054 A1 | 3/2007 |
| JP | 2000-195243 | 7/2000 |
| JP | 2002262213 | * 3/2001 |
| JP | 2002-262213 | 9/2002 |
| JP | 2007-028246 | 2/2007 |

OTHER PUBLICATIONS

European Search Report dated Mar. 18, 2010, in EP 09 25 0478.

* cited by examiner

*Primary Examiner* — Brandon Hoffman
*Assistant Examiner* — Hee Song
(74) *Attorney, Agent, or Firm* — Finnegan, Henderson, Farabow, Garrett & Dunner, LLP

(57) ABSTRACT

Disclosed herein is a receiving apparatus for sending received contents to a recording apparatus and for getting the recording apparatus to record the contents in accordance with preset recording reservations, the receiving apparatus including: a recording ready time information acquisition section configured to acquire from the recording apparatus information about a recording ready time; a continuous recording determination section configured to determine whether two chronologically successive broadcast contents are reserved for recording based on the preset recording reservations; and an end time setting section configured such that if the two chronologically successive broadcast contents are found reserved for recording, then the end time setting section sets the time at which to end processing for recording the earlier of the two contents based on a broadcast start time of the latter of the two contents and on the acquired information about the recording ready time.

10 Claims, 7 Drawing Sheets

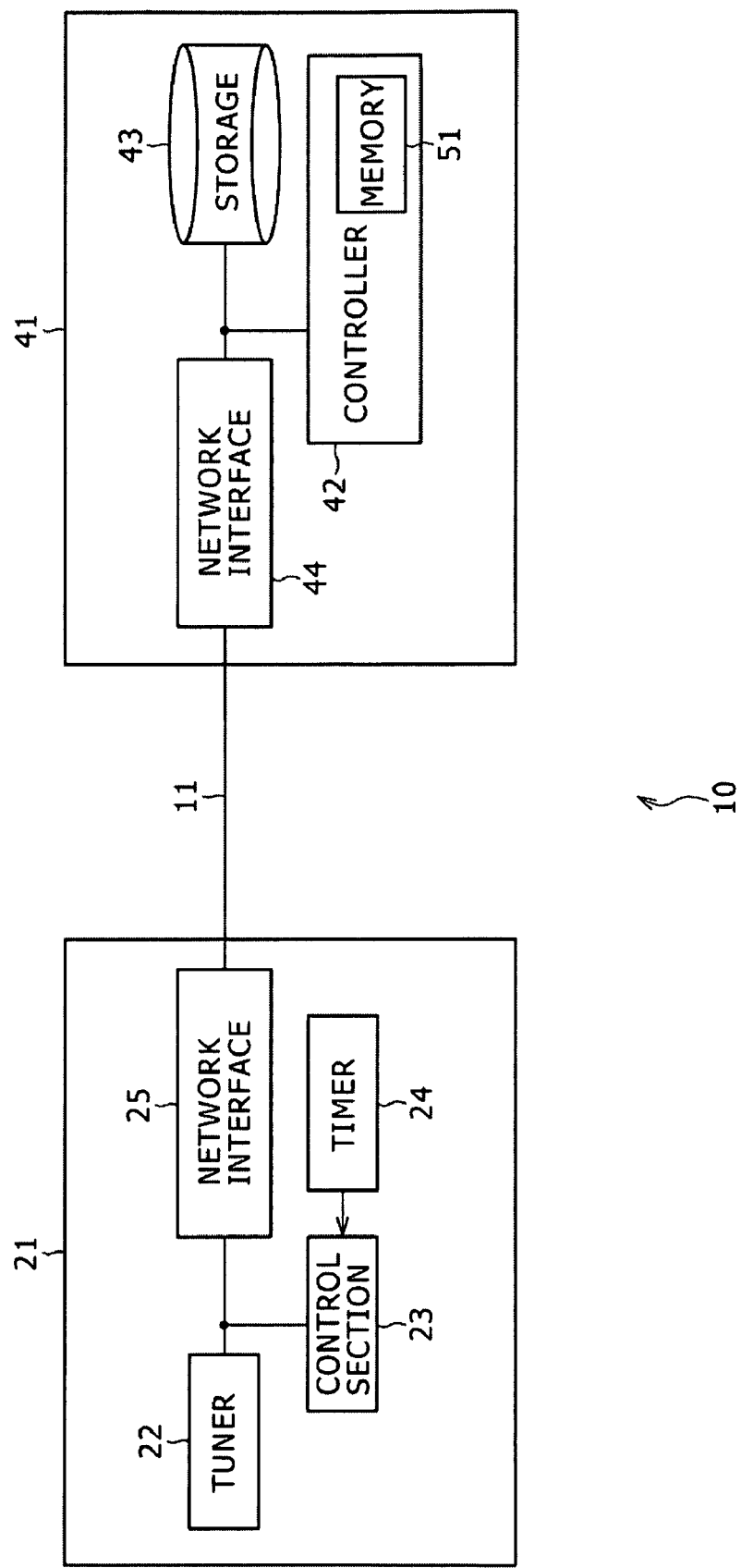

FIG.2

```
<root xmlns="urn:schemas-upnp-org:device-1-0">
<specVersion>
<major>1 </major>
<minor>0</minor>
</specVersion>
<URLBase>base URL for all relative URLs</URLBase>
<device>
<deviceType>urn:schemas-upnp-org:device:Basic:1</deviceType>
<friendlyName>short user-friendly title</friendlyName>
<manufacturermanufacturer> name</manufacturer
> <manufacturerURL>URL to manufacturer site</manufacturerURL>
<modelDescription>long user-friendly title</modelDescription>
<modelName>model name</modelName>
<modelNumber>model number</modelNumber>
<modelURL>URL to model site</modelURL>
<serialNumber>manufacturer's serial number</serialNumber>
<UDN>uuid:UUID</UDN>
<UPC>Universal Product Code</UPC>
<recReadyTime> time </recReadyTime>  ~101
<iconList>
<icon>
<mimetype>image/format</mimetype>
<width>horizontal pixels</width>
<height>vertical pixels</height>
<depth>color depth</depth>
<url>URL to icon</url>
</icon>
XML to declare other icons, if any, go here
</iconList>
<presentationURL>URL for presentation</presentationURL>
</device>
</root>
```

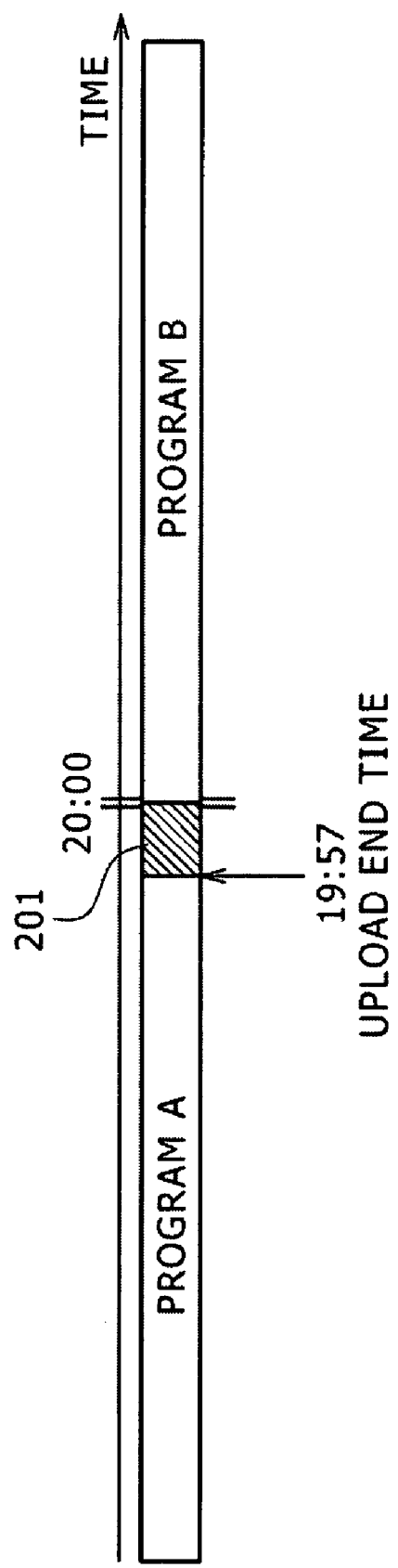

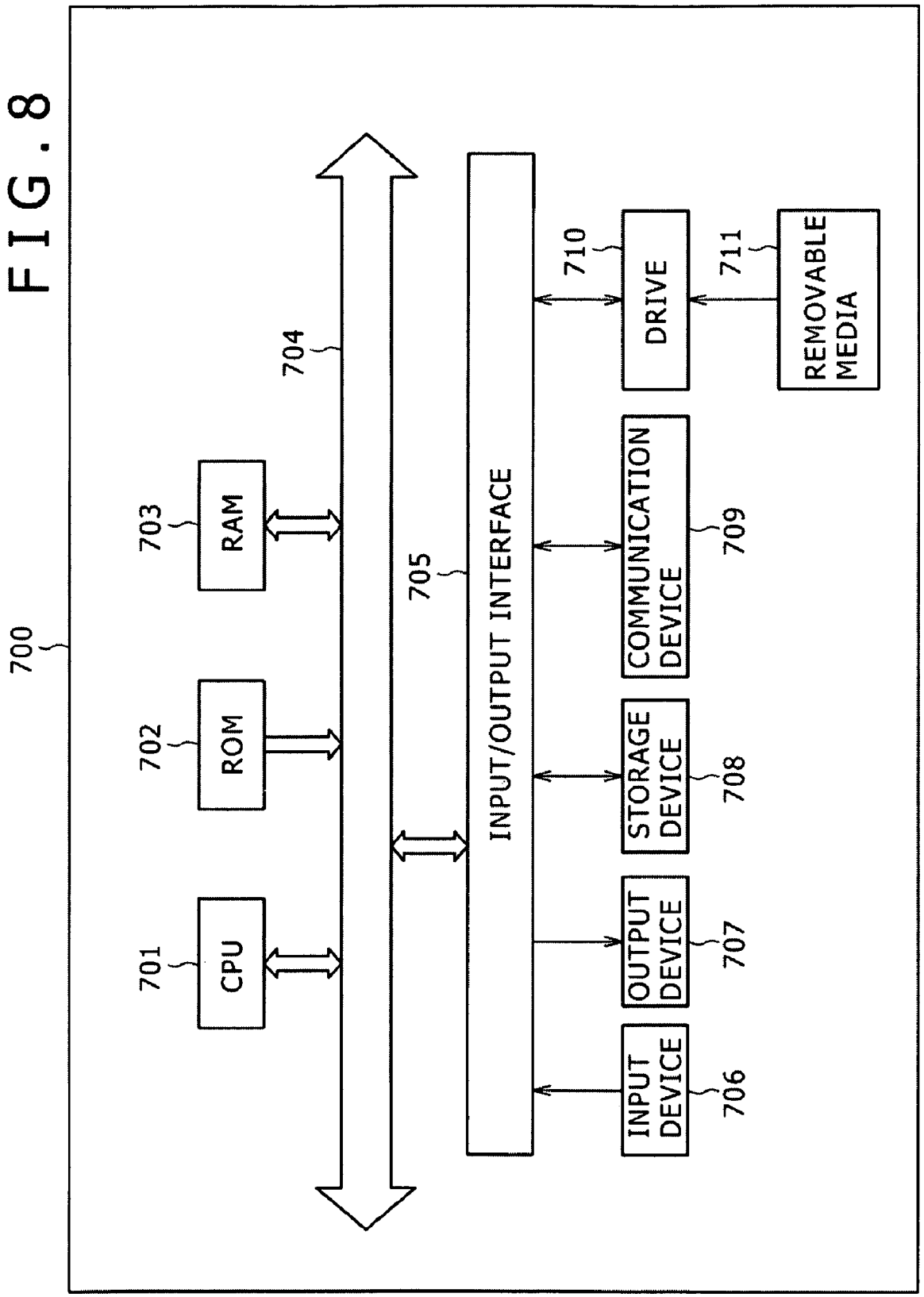

RECEIVING APPARATUS, RECEIVING METHOD, RECORDING APPARATUS, RECORDING METHOD, PROGRAM, RECORDING MEDIUM, AND NETWORK SYSTEM

CROSS REFERENCES TO RELATED APPLICATIONS

The present invention contains subject matter related to Japanese Patent Application JP 2008-086709 filed in the Japan Patent Office on Mar. 28, 2008, the entire contents of which being incorporated herein by reference.

BACKGROUND OF THE INVENTION

1. Field of the Invention

The present invention relates to a receiving apparatus, a receiving method, a recording apparatus, a recording method, a program, a recording medium, and a network system. More particularly, the invention relates to a receiving apparatus, a receiving method, a recording apparatus, a recording method, a program, a recording medium, and a network system for recording desired broadcast programs more reliably than before.

2. Description of the Related Art

Recent years have witnessed the widespread use of technologies for interconnecting PCs which stands for personal computers, their peripherals, AV equipment which stands for audio visual equipment, telephones, home electrical appliances and the like on a network in the household and for allowing the networked devices to share their functions. Diverse technical specifications for bringing about such interconnecting networks have been proposed. As part of the effort for implementing household interconnectedness, a set of technical specifications known as UPnP (Universal Plug and Play) has been proposed.

UPnP is based on standardized technologies supporting the Internet and aims to let devices and apparatuses start to function when they are simply connected to the network, with no complicated operations or settings. Illustratively under UPnP, a content received by a receiver connected to a network may be recorded by a recorder also on the network.

More specifically, the content received by the receiver is recorded by the recorder using an action called "CreateObject" stipulated by UPnP. Then an "http-post" process defined by UPnP is executed, causing the data of the content to be sent to a predetermined URL (uniform resource locators). In this manner, the data of the content received by the receiver is uploaded to and recorded by the recorder. On the side of the recorder, the individual contents uploaded and recorded are managed in the form of files.

Japanese Patent Laid-Open No. 2000-195243 proposes an automatic recording system involving a set-top box (STB) with timer-based unattended program recording reservation settings. According to the proposed system, when a reserved recording preset time is reached on the STB, a changeover switch is set to the connection terminal position so that the video signal is output for a few seconds with the DC level of the color signal kept on 0.8 V. Upon detecting that voltage level, a DC detector in the VTR (which stands for video tape recorder) causes a power controller to apply power before a recording controller is activated to start recording the preset program. In this manner, recording is carried out in synchronism with the timer settings made on the STB.

SUMMARY OF THE INVENTION

However, when two chronologically successive broadcast programs are to be recorded as contents by the proposed system, the recorder needs to close a file system for the first broadcast program (content) upon completion of the uploading thereof and to open the file system for the second broadcast program (content) before the start of the uploading of the latter. That is, a certain period of time is required to elapse between the end of recording of the first content and the start of recording of the second content. It follows that although the first program can be recorded to the end, an initial part of the second program may not be properly recorded.

The present invention has been made in view of the above circumstances and provides arrangements for recording reserved broadcast programs more reliably than before.

In carrying out the present invention and according to one embodiment thereof, there is provided a receiving apparatus for sending received contents to a recording apparatus and for getting the recording apparatus to record the contents in accordance with preset recording reservations, the receiving apparatus including: a recording ready time information acquisition section configured to acquire from the recording apparatus information about a recording ready time that elapses from the time the recording of one content is ordered to be ended until the recording of another content is ready to be started; a continuous recording determination section configured to determine whether two chronologically successive broadcast contents are reserved for recording based on the preset recording reservations; and an end time setting section configured such that if the two chronologically successive broadcast contents are found reserved for recording, then the end time setting section sets the time at which to end processing for recording the earlier of the two contents based on a broadcast start time of the latter of the two contents and on the acquired information about the recording ready time.

Preferably, by communicating with the recording apparatus over the network under protocols stipulated by a standard known as UPnP (which stands for Universal Plug and Play), the recording ready time information acquisition section may acquire the recording ready time in accordance with the protocols.

Preferably, the recording ready time information may be defined by UPnP and described by predetermined tags within device description information held by the recording apparatus.

Preferably, the receiving apparatus may store information for identifying the recording apparatus and, when storing the information for identifying the recording apparatus, the receiving apparatus may acquire and stores address information for identifying the location at which is stored the recording ready time information inside the recording apparatus.

According to another embodiment of the present invention, there is provided a receiving method for use with a receiving apparatus for sending received contents to a recording apparatus and for getting the recording apparatus to record the contents in accordance with preset recording reservations, the receiving method including the steps of: acquiring from the recording apparatus information about a recording ready time that elapses from the time the recording of one content is ordered to be ended until the recording of another content is ready to be started; determining whether two chronologically successive broadcast contents are reserved for recording based on the preset recording reservations; and if the two chronologically successive broadcast contents are found reserved for recording, then setting the time at which to end processing for recording the earlier of the two contents based on a broadcast start time of the latter of the two contents and on the acquired information about the recording ready time.

According to a further embodiment of the present invention, there is provided a program including the steps of causing a computer to function as a receiving apparatus for sending received contents to a recording apparatus and for getting the recording apparatus to record the contents in accordance with preset recording reservations, the receiving apparatus including: a recording ready time information acquisition section configured to acquire from the recording apparatus information about a recording ready time that elapses from the time the recording of one content is ordered to be ended until the recording of another content is ready to be started; a continuous recording determination section configured to determine whether two chronologically successive broadcast contents are reserved for recording based on the preset recording reservations; and an end time setting section configured such that if the two chronologically successive broadcast contents are found reserved for recording, then the end time setting section sets the time at which to end processing for recording the earlier of the two contents based on a broadcast start time of the latter of the two contents and on the acquired information about the recording ready time.

Where the above-outlined receiving apparatus, receiving method, or program embodying the present invention is in use, the information about the recording ready time that elapses from the time the recording of one content is ordered to be ended until the recording of another content is ready to be started is first acquired from the recording apparatus. A check is then made to determine whether two chronologically successive broadcast contents are reserved for recording based on the preset recording reservations. If the two chronologically successive broadcast contents are found reserved for recording, then the time is set at which to end processing for recording the earlier of the two contents based on the broadcast start time of the latter of the two contents and on the acquired information about the recording ready time.

According to an even further embodiment of the present invention, there is provided a recording apparatus for recording received contents sent by a receiving apparatus configured to receive contents, the recording apparatus including: a storage section configured to store recording ready time information for use by the receiving apparatus preset with two chronologically successive broadcast contents reserved for recording, the recording ready time information allowing the receiving apparatus to set a recording ready time that elapses from the time the recording of the earlier of the two contents is ordered to be ended until the recording of the latter of the two contents is ready to be started; and an address information output section configured to output address information onto a network connected with the receiving apparatus, the address information identifying the location at which is stored the recording ready time information inside the storage section.

Preferably, the recording ready time information may be defined by UPnP (which stands for Universal Plug and Play) and described by predetermined tags within device description information.

According to a still further embodiment of the present invention, there is provided a recording method for use with a recording apparatus for recording received contents sent by a receiving apparatus configured to receive contents, the recording method including the steps of: causing a storage section of the recording apparatus to store recording ready time information for use by the receiving apparatus preset with two chronologically successive broadcast contents reserved for recording, the recording ready time information allowing the receiving apparatus to set a recording ready Lime that elapses from the time the recording of the earlier of the two contents is ordered to be ended until the recording of the latter of the two contents is ready to be started; and outputting address information onto a network connected with the receiving apparatus, the address information identifying the location at which is stored the recording ready time information inside the storage section.

According to a yet further embodiment of the present invention, there is provided a program including the steps of causing a computer to function as a recording apparatus for recording received contents sent by a receiving apparatus configured to receive contents, the recording apparatus including: a storage section configured to store recording ready time information for use by the receiving apparatus preset with two chronologically successive broadcast contents reserved for recording, the recording ready time information allowing the receiving apparatus to set a recording ready time that elapses from the time the recording of the earlier of the two contents is ordered to be ended until the recording of the latter of the two contents is ready to be started; and an address information output section configured to output address information onto a network connected with the receiving apparatus, the address information identifying the location at which is stored the recording ready time information inside the storage section.

Where the above-outlined recording apparatus, recording method, or program embodying the present invention is in use, the storage section of the recording apparatus is first caused to store the recording ready time information for use by the receiving apparatus preset with two chronologically successive broadcast contents reserved for recording, the recording ready time information allowing the receiving apparatus to set the recording ready time that elapses from the time the recording of the earlier of the two contents is ordered to be ended until the recording of the latter of the two contents is ready to be started. Address information is then output onto a network connected with the receiving apparatus, the address information identifying the location at which is stored the recording ready time information inside the storage section.

According to another embodiment of the present invention, there is provided a network system including a receiving apparatus and a recording apparatus interconnected via a network, the receiving apparatus receiving contents based on preset recording reservations, the recording apparatus recording the contents received by the recording apparatus; wherein the receiving apparatus includes: a recording ready time information acquisition section configured to acquire from the recording apparatus information about a recording ready time that elapses from the time the recording of one content is ordered to be ended until the recording of another content is ready to be started; a continuous recording determination section configured to determine whether two chronologically successive broadcast contents are reserved for recording based on the preset recording reservations; and an end time setting section configured such that if the two chronologically successive broadcast contents are found reserved for recording, then the end time setting section sets the time at which to end processing for recording the earlier of the two contents based on a broadcast start time of the latter of the two contents and on the acquired information about the recording ready time; and wherein the recording apparatus includes: a storage section configured to store the recording ready time information for use by the receiving apparatus preset with the two chronologically successive broadcast contents reserved for recording, the recording ready time information allowing the receiving apparatus to set the recording ready time that elapses from the time the recording of the earlier of the two contents is ordered to be ended until the recording of the latter of the two contents is ready to be started; and an address information output section configured to output address information onto the network connected with the receiving apparatus, the address information identifying the location at which is stored the recording ready time information inside the storage section.

Where the above-outlined network system embodying the present invention is in use, the information about the recording ready time that elapses from the time the recording of one content is ordered to be ended until the recording of another content is ready to be started is first acquired from the recording apparatus. A check is then made to determine whether two chronologically successive broadcast contents are reserved for recording based on the preset recording reservations. If the two chronologically successive broadcast contents are found reserved for recording, then the time is set at which to end processing for recording the earlier of the two contents based on the broadcast start time of the latter of the two contents and on the acquired information about the recording ready time. Meanwhile, the storage section of the recording apparatus is caused to store the recording ready time information for use by the receiving apparatus preset with the two chronologically successive broadcast contents reserved for recording, the recording ready time information allowing the receiving apparatus to set the recording ready time that elapses from the time the recording of the earlier of the two contents is ordered to be ended until the recording of the latter of the two contents is ready to be started. Address information is then output onto the network connected with the receiving apparatus, the address information identifying the location at which is stored the recording ready time information inside the storage section.

According to the above-outlined embodiments of the present invention, reserved broadcast programs can be recorded more reliably than before.

BRIEF DESCRIPTION OF THE DRAWINGS

Further advantages of an embodiment of the present invention will become apparent upon a reading of the following description and appended drawings in which:

FIG. 1 is a block diagram showing a typical configuration of a network system embodying the present invention;

FIG. 2 is a tabular view showing an example of XML (extensible markup language) statements stored in a memory of a recorder constituting part of the embodiment in FIG. 1;

FIG. 7 is a schematic view showing how broadcast programs are typically reserved for recording; and FIG. 8 is a block diagram showing a typical structure of a personal computer.

DETAILED DESCRIPTION OF THE PREFERRED EMBODIMENTS

Figure 3:
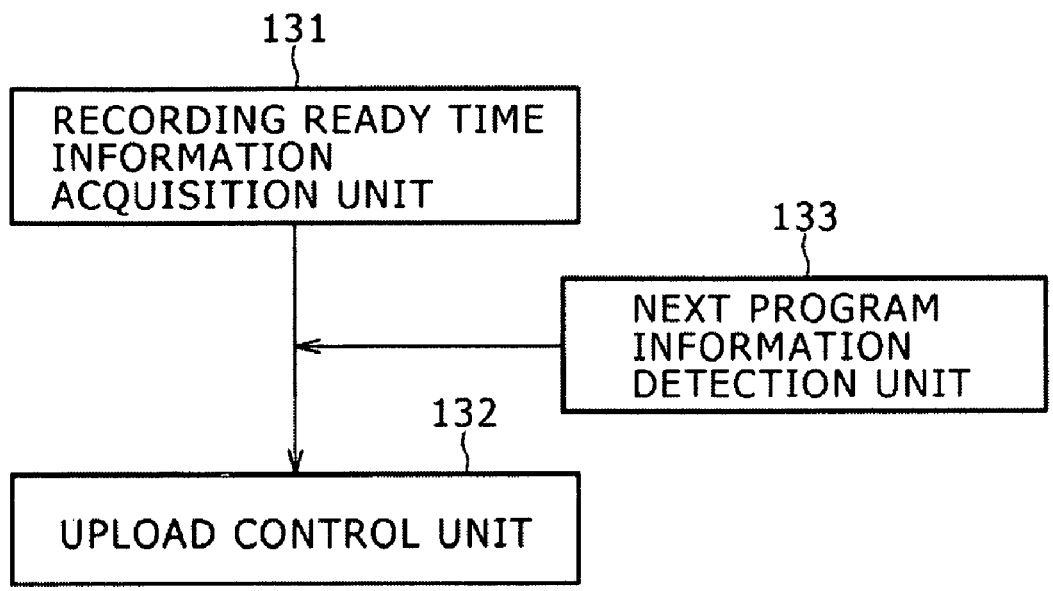
FIG. 3 is a block diagram showing a typical functional structure of software executed by a control section constituting part of the embodiment in FIG. 1.

The preferred embodiments of the present invention will now be described in reference to the accompanying drawings. FIG. 1 is a block diagram showing a typical configuration of a network system 10 embodying the present invention. The network system 10 is illustratively composed of apparatuses that comply with the specifications of UPnP (Universal Plug and Play).

In the configuration of FIG. 1, the network system 10 has a receiver 21 and a recorder 41 interconnected with each other via a network 11. The network 11 may illustratively be a local area network such as the Ethernet®.

The network system 10 is typically capable of having contents viewed or recorded using the receiver 21 and recorder 41. For example, the user of the network system 10 may reserve desired broadcast programs for unattended recording by making suitable operations on the receiver 21 using a remote controller, not shown. In such a case, it is assumed that the recorder 41 does not directly receive and record broadcast programs. Instead, the receiver 21 first receives the broadcast programs and the recorder 41 then records the programs that have been received by the receiver 21.

The receiver 21 is typically structured as a set-top box (STB) that contains a tuner 22. Illustratively the tuner 22 receives and decodes digital broadcast signals making up the content data that has been compression-encoded as per a predetermined compression encoding scheme such as MPEG-2. After decoding the digital broadcast signals into video and audio data, the receiver 21 sends the resulting data as needed onto the network 11 as the content data.

The receiver 21 further includes a control section 23, a timer 24, and a network interface 25. The control section 23 illustratively contains a processor and a memory and controls the components of the receiver 21 in keeping with preinstalled programs or the like. As needed, the control section 23 acquires time-related information counted by the timer 24 and performs time-based processes.

The network interface 25 outputs onto the network 11 the data coming from the tuner 22 or from the control section 23 over an internal bus or through other suitable routes inside the receiver 21. The network interface 25 also receives data placed onto the network 11, and forwards the received data onto the internal bus or the like in the receiver 21.

The recorder 41 is typically made up of a HDD (hard disk drive) recorder or a DVD (digital versatile disk) recorder. When recording broadcast programs (i.e., contents), the recorder 41 receives the data of the contents sent by the receiver 21 and records the received data content to an internal storage 43. The storage 43 is illustratively constituted by a HDD or a DVD drive.

The recorder 41 also includes a controller 42 and a network interface 44. The controller 42 contains a processor and a memory, and controls the components of the recorder 41 in accordance with preinstalled programs or the like.

The network interface 44 outputs onto the network 11 the data coming from the controller 42 or from the storage 43 over an internal bus or through other suitable routes inside the recorder 41. The network interface 44 also receives data placed onto the network 11 and forwards the received data onto the internal bus or the like inside the recorder 41.

Furthermore, the controller 42 outputs URL's (uniform resource locators) as needed onto the network 11, the URL's constituting address information for locating information stored in an internal memory 51.

In the receiver 21, the control section 23 illustratively accepts reservations of the broadcast programs (contents) to be received according to the user's operations. In accepting the program reception reservations, the control section 23 detects a broadcast start time and a broadcast end time of each of the reserved programs based on the time information counted by the timer 24. Every time a reserved broadcast time period is reached and started, the control section 23 receives the content being broadcast during that time period on a predetermined broadcast channel.

The program (i.e., content) to be broadcast may be reserved in one of two ways. The user may manually input the channel on which the desired program is to be broadcast and the broadcast start time and broadcast end time of the program in question. Alternatively, based on a search through program-related information such as EPG (electronic program guide) for desired programs, the receiver 21 may automatically input the channel over which each desired program is to be broadcast as well as the broadcast start time and broadcast end time of the program in question.

The control section 23 is typically configured to accept program recording reservations based on the user's operations. When accepting program recording reservations, the control section 23 identifies the apparatus that is caused to record the reserved programs. Since the receiver 21 can receive programs but cannot record them, the recorder 41 is illustratively identified as the apparatus for carrying out recording processes. It is assumed that an internal memory or the like in the control section 23 stores beforehand the information for identifying the recorder 41 (e.g., its IP address which stands for Internet Protocol address) as an apparatus capable of recording programs.

Upon accepting a program recording reservation, the control section 23 detects the broadcast start time and broadcast end time of the reserved program based on the time information counted by the timer 24. When the reserved broadcast time period is reached and started, the control section 23 receives the content being broadcast on a predetermined broadcast channel during the reserved time period. At the same time, the control section 23 sends the data of the received content to the recorder 41 over the network 11. More specifically, the content received by the receiver 21 is recorded by the recorder 41 as follows: an object is first generated using an action "CreateObject" stipulated by UPnP. A process called "http-post" also defined by UPnP is then carried out to send the content data to a predetermined URL. In this manner, the data of the content received by the receiver 21 is uploaded to and recorded by the recorder 41.

The individual contents uploaded to and recorded by the recorder 41 are written illustratively to the storage 43. The recorded contents are each managed as a file.

The storage 43 in the recorder 41 is typically constituted by the HDD (hard disk drive) or DVD (digital versatile disk) drive as mentioned above. The recorder 41 has a file system installed inside as software to be executed by the controller 42. This file system is designed to manage, among others, the locations at which data is recorded in the storage 43. The file system illustratively utilizes a file allocation table whereby the file names of the files recorded in the storage 42 are associated with record units such as the sectors in which data is actually recorded.

For example, the file allocation table contains information specifying the sectors being used (i.e., filled with data) and not used (free of data). When the file allocation table is updated in a timely manner to reflect the data getting recorded (written) to or deleted from a storage medium, that storage medium can be utilized effectively as a resource offering a predetermined recording capacity.

In order to read and write data, the file system carries out processes known as system calls including "open," "read," "write," and "close." Illustratively, when writing data to the storage 43, the file system processes the system call "open." Upon completion of the data write operation to the storage 43, the file system processes the system call "close." This causes the content data to be recorded as a file in the storage 43.

When uploading a content to the recorder 41, the receiver 21 first performs the action "CreateObject" stipulated by UPnP. In turn, the file system of the recorder 41 processes the system call "open." Upon receipt of a packet designating an end of the upload process from the receiver 21, the file system of the recorder 41 processes the system call "close."

More specifically, the packet designating an end of the upload process is a packet which has a parameter "chunk size" set to "0." This packet is sent by the receiver 21 to the recorder 41 to indicate that the upload process has ended.

In the past, when a broadcast content was recorded, the packet with its parameter "chunk size" set to "0" was sent from the receiver 21 to the recorder 41 at the broadcast end time of the content. The packet caused the file system of the recorder 41 to process the system call "close."

It takes some time for the file system to process the system call "close." It also takes time for the file system to process the system call "open." It follows that when two chronologically successive contents are to be recorded in the ordinary setup, the latter of the two contents might have its initial part truncated when recorded.

Ordinarily, the earlier of the two chronologically successive contents ends at the broadcast end time of the content in question, followed by a certain time period at the end of which the latter of the two contents is made ready to be recorded by the recorder 41. Such a time lag is brought about when the packet with its parameter "chunk size" set to "0" is sent by the receiver 21, with the system calls "close" and "open" processed consecutively by the file system of the recorder 41.

According to an embodiment of the present invention, the receiver 21 obtains beforehand information about the time required by the recorder 41 to process the system calls "close" and "open." That information is called the recording ready time information in this specification. When two chronologically successive contents are to be recorded, the receiver 21 sets an upload end time of the earlier of the two broadcast contents based on the above-defined recording ready time information. When the upload end time is reached, the receiver 21 sends the packet with its parameter "chunk size" to "0" to the recorder 41.

In other words, by taking the recording ready time of the recorder 41 into consideration, the receiver 21 forcibly terminates the process of uploading the earlier of the two chronologically successive contents. This makes it possible to start recording the latter of the two successively broadcast contents exactly from the beginning of the content in question.

According to this invention, the recording ready time information of the recorder 41 is included in the information called "Device Description" stipulated by UPnP as information defining the device type. The Device Description is disclosed in detail in the document titled "Basic: 1.0 Device Definition Version 1.0 For UPnP™ Version 1.0" issued by UPnP FORUM, an organization that drafts and establishes the UPnP specifications and related requirements.

FIG. 2 is a tabular view showing an example of Device Description written in XML statements. With the embodiment of the present invention, tags denoting the recording ready time information of the recorder 41 are inserted into the Device Description in XML statements. In the example of FIG. 2, the tags representing the recording ready time information are inserted in an area 101 as part of the Device Description in XML statements.

The area 101 in FIG. 2 shows a description <recReadyTime>time</recReadyTime>. In the area 101, the recording ready time information is denoted by the tags <recReadyTime>. More specifically, in the middle part "time" of the area 101 is described the actual recording ready time of the recorder 41 (e.g., time required to process the system calls "close" and "open"). If the recording ready time of the recorder 41 is three minutes, then a description <recReadyTime>3 minutes</recReadyTime> is written in the area 101 of FIG. 2.

In the above example, the information about the time it takes to process the system calls "close" and "open" was shown described as the recording ready time information using <recReadyTime> tags. Alternatively, different tags may be used to denote the time required to process the system calls "close" and "open." For example, the time it takes to process the system call "close" may be represented by <recFinTime> tags and the time required to process the system call "open" may be denoted using <recStatTime> tags. In this alternative example, the area 101 in FIG. 2 would have <recFinTime>time</recFinTime>, <recStatTime>time</recStatTime> written therein.

The Device Description in such XML statements is stored illustratively in the internal memory 51 of the controller 42 in the recorder 41. As needed, the recorder 41 outputs onto the network 11 the URL (uniform resource locator) of the address information identifying the location at which the Device Description is stored in the memory 51.

Illustratively, when the recorder 41 is connected to the network 11 and activated, the recorder 41 multicasts the above-mentioned URL over the network 11 in accordance with a protocol called SSDP (Simple Service Discover Protocol) under UPnP. Also multicast at this point is information identifying the recorder 41, sent to other UPnP-compatible apparatuses (e.g., receiver 21) connected to the network 11 in addition to the URL of the address information identifying the location at which the Device Description is stored. The details of SSDP are disclosed illustratively in the document titled "UPnP Device Architecture 1.0" issued by UPnP FORUM.

Alternatively, at the time when the receiver 21 is operated to register recorders capable of recording content data, the URL of the Device Description in the recorder 41 may be multicast in accordance with the above-mentioned SSDP in the direction of the receiver 21.

According to an embodiment of the present invention, as described, predetermined tags are inserted in the Device Description to describe the recording ready time. This arrangement makes it possible to designate the recording ready time with no need to add special functions to the receiver 21 or recorder 41 or to get them to execute special processes.

FIG. 3 is a block diagram showing a typical functional structure of software such as programs executed by the control section 23 of the receiver 21. In FIG. 3, a recording ready time information acquisition unit 131 acquires the recording ready time information of other apparatuses.

Illustratively, when the above-mentioned SSDP-based multicast operation is performed, the recording ready time information acquisition unit 131 acquires the URL of the multicast packet coming from another apparatus (e.g., recorder 41). The recording ready time information acquisition unit 131 proceeds to store the obtained URL in association with an ID or the like identifying the multicasting apparatus. As needed, the recording ready time information acquisition unit 131 accesses the acquired URL to obtain the recording ready time information of the apparatus in question and stores the obtained recording ready time in conjunction with the ID identifying that apparatus. Typically, the ID for identifying the apparatus of interest may be its IP address. The recording ready time information acquisition unit 131 controls the receiver 21 in such a manner as to carry out the above-described processes.

An upload control unit 132 controls uploading of content data to the recorder 41 illustratively based on preset reservations or on the commands input by use of a remote controller.

The upload control unit 132 typically performs the action "CreateObject" stipulated by UPnP. Upon receipt of the action "CreateObject," the recorder 41 sends to the receiver 21 a URL (uniform resource locator) denoting the storage area for accommodating content data. Thereafter, the upload control unit 132 carries out the process "http-post" defined by UPnP to transmit the content data to the URL that has been received.

Figure 4:
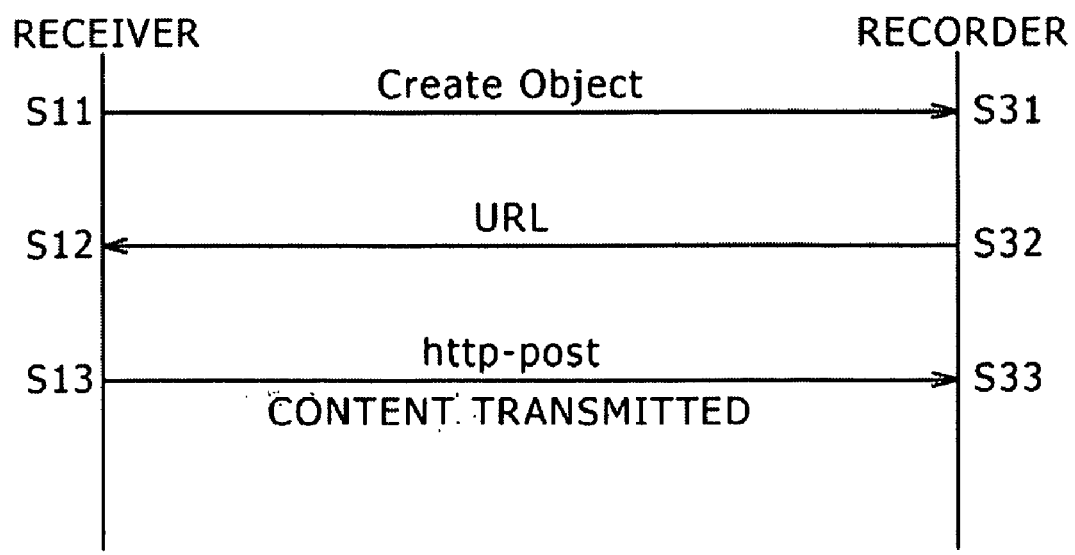
FIG. 4 is an arrow diagram of typical steps in which a content is uploaded in a manner stipulated by UPnP.

The content upload process stipulated by UPnP is described below in reference to the arrow diagram of FIG. 4. In the example of FIG. 4, the receiver 21 acting as a control point is shown uploading a content to the recorder 41 serving as a media server.

In step S11, the receiver 21 performs the action "CreateObject" stipulated by UPnP. The operation causes information described in XML to be sent to the recorder 41. In step S31, the recorder 41 receives the transmitted information.

After receiving the action "CreateObject" in step S31, the recorder 41 goes to step S32 and sends to the receiver 21 the URL (uniform resource locator) denoting the storage area for storing content data. In step S12, the receiver 21 receives the URL.

In step S13, the receiver 21 carries out the process "http-post" defined by UPnP in order to send the content data to the URL that was received in step S12.

In step S33, the recorder 41 receives the content data sent by the receiver 21 in step S13. The received content data is stored into the storage 43.

In the steps described above, the receiver 21 (control point) uploads the content to the recorder 41 (media server). Before starting the uploading process, the upload control unit 132 acquires what has been detected by a next program information detection unit 133.

The next program information detection unit 133 checks program recording reservations set on the control section 23 to see if there are reserved programs which chronologically follow the program about to be uploaded. Illustratively, the next program information detection unit 133 checks the broadcast start times of the programs reserved to be recorded, and compares the checked times with the broadcast end time of the program about to be uploaded. Through the comparisons, the next program information detection unit 133 determines if, among the reserved programs, there is a program of which the broadcast is set to start before a predetermined time period (e.g., three minutes) elapses subsequent to the broadcast end time of the program about to be uploaded.

If there is found a program of which the broadcast is started before such a predetermined time period elapses following the broadcast end time of the program about to be uploaded, then the next program information detection unit 133 determines that two chronologically successive programs are reserved for recording. If no such program is detected, the next program information detection unit 133 determines that two chronologically successive programs are not reserved for recording. Given the result of the determination, the next program information detection unit 133 supplies the upload control unit 132 with information specifying whether two chronologically successive programs are reserved for recording.

When receiving the detected information saying that two chronologically successive programs are reserved for recording, the upload control unit 132 determines the time at which to end the uploading of the content to another apparatus (e.g., recorder 41) based on the recording reservation information and on the recording ready time information obtained by the recording ready time information acquisition unit 131. Illustratively, on the basis of the recording reservation information, the upload control unit 132 determines the broadcast start time of the latter of the two chronologically successive programs. At the same time, the upload control unit 132 determines the recording ready time of the recorder 41 and sets a suitable margin thereof. Illustratively, the margin may be the same as the recording ready time. This margin is added to the broadcast start time for the latter of the two chronologically successive programs, and the resulting sum is established as the time at which to end the uploading process of the content about to be uploaded.

Based on time information supplied illustratively by the timer 24, the upload control unit 132 further determines whether the current time is the time at which to end the uploading process of the content. When the current time is found to be the time at which to end the uploading process of the content, the upload control unit 132 sends the above-mentioned packet with its parameter "chunk size" set to "0" to the recorder 41 over the network 11, the packet being designed to terminate the uploading process. The upload control unit 132 and next program information detection unit 133 control the receiver 21 in such a manner as to effect the above-described processes.

Figure 5:
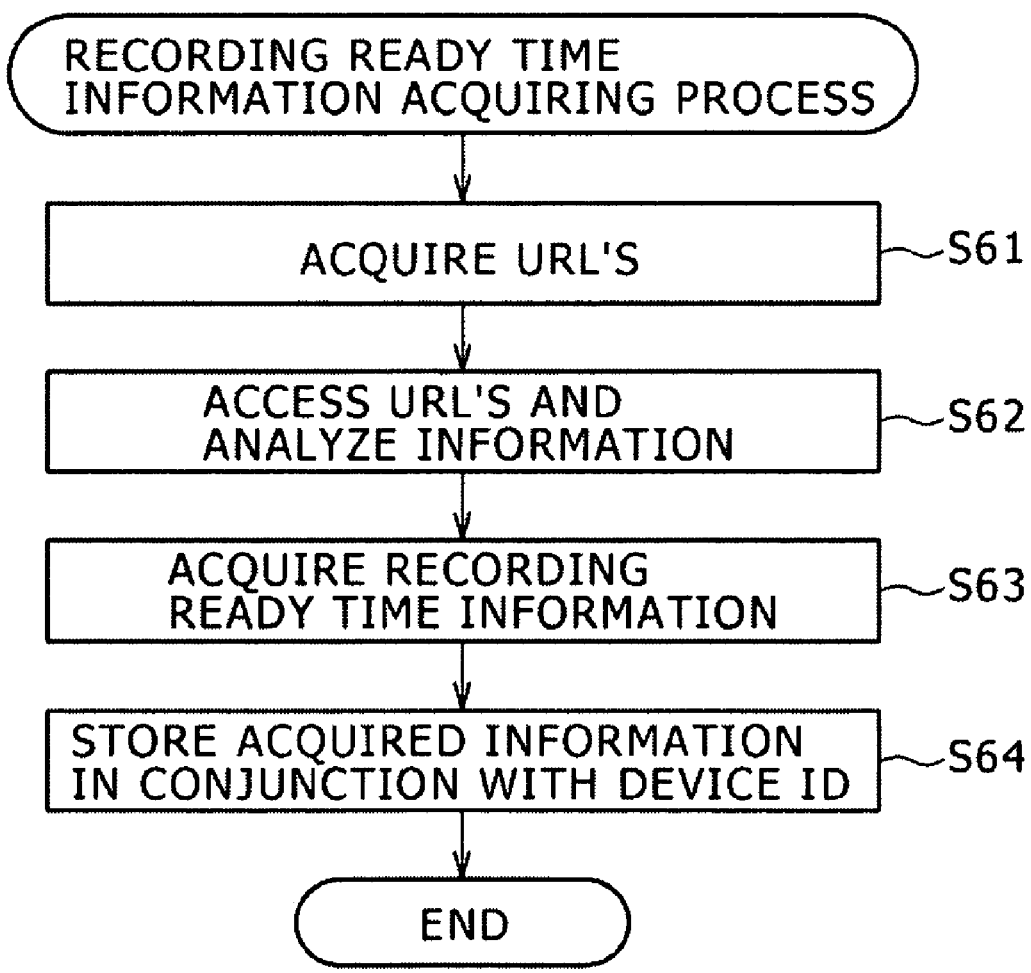
FIG. 5 is a flowchart of typical steps constituting a recording ready time information acquiring process.

Described below in reference to the flowchart of FIG. 5 is the recording ready time information acquiring process performed by the receiver 21. This process is carried out typically when the recorder 41 is connected to the network 11. Alternatively, the process may be executed in conjunction with the user's operations for registering a recorder capable of recording content data.

In step S61, the recording ready time information acquisition unit 131 obtains the URL contained in the above-mentioned SSDP-compatible multicast packet coming illustratively from the recorder 41. The recording ready time information acquisition unit 131 stores the acquired URL in combination with an ID or the like identifying the packet-sending apparatus.

As mentioned above, the URL may be multicast over the network 11 in accordance with the protocol called SSDP when the recorder 41 is connected to the network 11 and activated. Alternatively, the URL may be multicast as per SSDP in conjunction with the user's operations for registering the recorder capable of recording content data. In any case, it is assumed that prior to step S61, the recorder 41 sends out the URL of the address information identifying the location at which is stored the above-mentioned Device Description or like specifics.

In step S62, the recording ready time information acquisition unit 131 gains access to the URL obtained in step S61, and analyzes the information found at the URL regarding the device type or like specifics. The information analyzed at this point is typically the Device Description discussed above in connection with FIG. 2.

In step S63, the recording ready time information acquisition unit 131 acquires recording ready time information. Illustratively, what is acquired at this point is the recording ready time information of the recorder 41 described using the tags <recReadyTime> in the area 101 of FIG. 2.

In step S64, the recording ready time information acquisition unit 131 stores the recording ready time information of the recorder 41 obtained in step S63, in conjunction with the ID or the like identifying the recorder 41.

In the steps described above, the recording ready time information of the recorder 41 is acquired and stored. If recording apparatuses other than the recorder 41 are connected to the network 11, the recording ready time information of these apparatuses is also obtained in like manner. The recording ready time information thus acquired is written to a suitable correspondence table associating the time information with the ID of each of the apparatuses involved, the table being stored illustratively in an internal memory of the control section 23.

In the example of FIG. 5, steps S61 through S64 are assumed to be carried out consecutively. Alternatively, following step S61, steps S62 through S64 may be performed as needed in a suitably timed manner.

Figure 6:
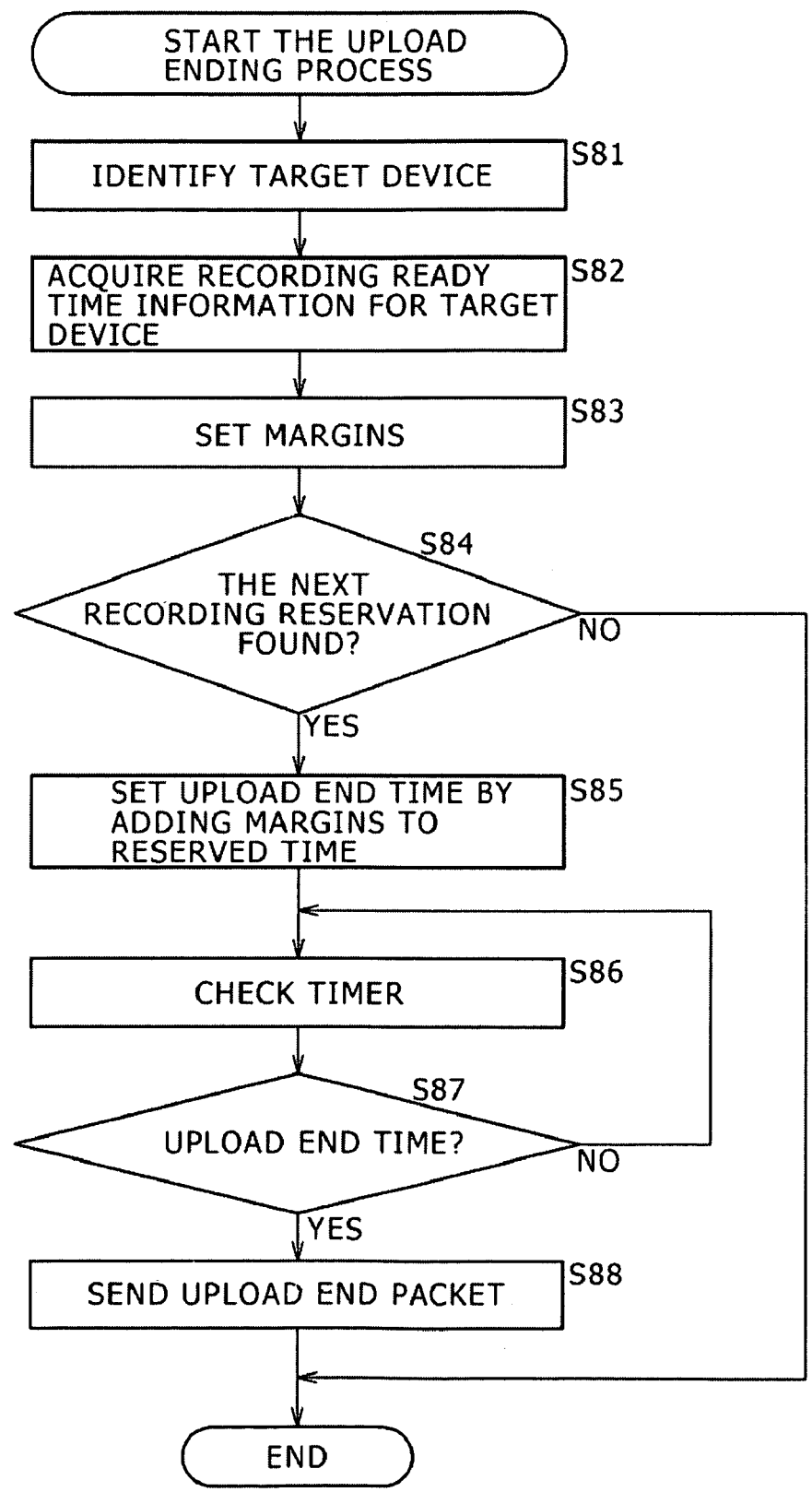
FIG. 6 is a flowchart of typical steps constituting an upload ending process.

Described below in reference to the flowchart of FIG. 6 is the upload ending process performed by the receiver 21. This process is carried out illustratively when the receiver 21 starts the process for uploading a content as part of the program (i.e., content) recording process.

In step S81, the upload control unit 132 identifies the target apparatus to which to upload the content based on the recording reservation information set on the receiver 21. It is assumed here that the recorder 41 is identified as the target apparatus.

In step S82, the upload control unit 132 determines the recording ready time of the target apparatus. Illustratively, the upload control unit 132 acquires the recording ready time of the recorder 41 stored in step S64 of FIG. 5.

In step S83, the upload control unit 132 sets an appropriate margin based on the recording ready time determined in step S82. Typically, the margin may be the same as the recording ready time.

In step S84, the upload control unit 132 checks to determine whether the next recording reservation exists. At this point, the upload control unit 132 obtains the result of a next program detecting process performed by the next program information detection unit 133.

As described above, the next program information detection unit 133 checks to see if there are reserved programs which chronologically follow the program about to be uploaded. If there is found a program of which the broadcast is started before a predetermined time period elapses following the broadcast end time of the program about to be uploaded, then the next program information detection unit 133 determines that two chronologically successive programs are reserved for recording. Based on the result of the determination, the next program information detection unit 133 supplies the upload control unit 132 with information specifying whether two chronologically successive programs are reserved for recording.

When acquiring the result of the detection indicating that two chronologically successive programs are reserved for recording, the upload control unit 132 in step S84 determines that the next recording reservation exists. Upon receipt of the result of the detection indicating that two chronologically successive programs are not reserved for recording, the upload control unit 132 in step S84 determines that the next recording reservation does not exist.

If in step S84 the next recording reservation is found to exist, then step S85 is reached. In step S85, based on the recording reservation information and on the margin set in step S83, the upload control unit 132 sets the time at which to end the process for uploading the content to the recorder 41 (i.e., upload end time). Illustratively, the upload control unit 132 adds the above-mentioned margin to the broadcast start time for the latter of the two chronologically successive programs, and establishes the resulting sum as the time at which to end the uploading process of the content about to be uploaded.

Consider the example of FIG. 7 in which two chronologically successive programs A and B are reserved for recording. It is assumed here that the broadcast of the program B starts at the same time as the broadcast of the program A ends. That is, where the process of FIG. 6 is executed, the program A about to be uploaded is immediately followed chronologically by the program B reserved for recording. Illustratively, suppose that the broadcast start time of the program B is 8 p.m. (20:00) and that the margin set in step S83 is three minutes. In that case, 7:57 p.m. (19:57) is the time at which to end the content uploading process (i.e., upload end time).

In step S86, the upload control unit 132 checks time information on the timer 24. This step determines the current time.

In step S87, the upload control unit 132 checks to determine whether the current time obtained in step S86 coincides with the upload end time set in step S85. If in step S87 the current time is not found to coincide with the upload end time, then control is returned to step S86. Steps S86 and S87 are repeated until the current time is found to coincide with the upload end time.

If in step S87 the current time is found to coincide with the upload end time, then step S88 is reached. In step S88, the upload control unit 132 sends a packet specifying an end of uploading to the recorder 41 over the network 11 in order to terminate the uploading process. More specifically, the upload control unit 132 sends the above-mentioned packet with its parameter "chunk size" set to "0" to the recorder 41. This operation causes the file system to process the system call "close" so that the recorder 41 will record the content data of the program A as a file. With the system call "close" processed, the process for uploading the content data of the program B is started.

The upload ending process is carried out as discussed above. When this process is performed, part of the content of the program A is not recorded but the content of the program B can be recorded from the beginning. In the example of FIG. 7, the recording of the program A is deprived of a portion which is broadcast between 7:57 p.m. (19:57) and 8 p.m. (20:00) and which corresponds to an area 201 in FIG. 7. That is because the receiver 21 forcibly terminates the uploading process by taking the recording ready time of the recorder 41 into consideration. The program B starts getting recorded exactly from its broadcast start time of 8 p.m. (20:00).

Back in step S84 of FIG. 6, if the next recording reservation is not found to exist, then steps S85 through S88 are skipped and the process is brought to an end. In this case, the program A shown in FIG. 7 is recorded in its entirety from the broadcast start time to the broadcast end time (at 8 a.m., or 20:00), including the portion corresponding to the area 201.

Although the process of FIG. 6 was described as getting executed when the process for uploading the content is started by the receiver 21 as part of the program recording process, this is not limitative of the present invention. Alternatively, the process may be repeated a plurality of times at predetermined time intervals after the process of uploading the program A in FIG. 7 is started until the recording of the program comes to an end. In this manner, if the program B is reserved for recording after the recording (upload) of the program A is started, the program B can still be recorded starting from its broadcast start time. According to the embodiment of the present invention, the user may have desired broadcast programs recorded more reliably than before as described.

The foregoing description dealt with the typical processes taking place between the receiver 21 and the recorder 41. However, this is not limitative of the present invention. The invention also applies to the processes to be carried out between the receiver 21 and other recorders.

The foregoing description was based on the assumption that the receiver 21 and recorder 41 are both UPnP-compatible apparatuses. However, the receiver 21 and recorder 41 need not be compatible with the UPnP specifications if the receiver 21 can reliably obtain the recording ready time information of the recorder 41 in predetermined steps.

The series of steps and processes described above may be executed either by hardware or by software. Where the software-based processing is to be carried out, the programs constituting the software may be either incorporated beforehand in dedicated hardware of a computer for program execution or installed upon use over a network or from a suitable recording medium into a general-purpose personal computer such as one in FIG. 8 capable of executing diverse functions based on the installed programs.

In the structure of FIG. 8, a CPU (central processing unit) 701 performs various processes in accordance with the programs held in a ROM (read only memory) 702 or in keeping with the programs loaded from a storage device 708 into a RAM (random access memory) 703. The RAM 703 may also accommodate data needed by the CPU 701 in carrying out its diverse processing.

The CPU 701, ROM 702, and RAM 703 are interconnected with one another by way of a bus 704. An input/output interface 705 is also connected to the bus 704.

The input/output interface 705 is further connected to an input device 706, an output device 707, the storage device 708, and a communication device 709. The input device 706 is typically made up of a keyboard and a mouse. The output device 707 is formed by a display such as a CRT (cathode ray tube) or an LCD (liquid crystal display) and by speakers. The storage device 708 is illustratively composed of a hard disk drive. The communication device 709 is typically constituted by a modem and a network interface card such as a LAN card. The communication device 709 conducts communications over networks including the Internet.

A drive 710 may be connected as needed to the input/output interface 705. A piece of removable media 711 such as a magnetic disk, an optical disk, a magneto-optical disk or a semiconductor memory may be loaded into the drive 710. Computer programs retrieved from the loaded removable medium may be installed as needed into the storage device 708.

Where the above-described processes or steps are to be performed by software, the program constituting the software are installed into the computer over networks such as the Internet or from an appropriate recording medium such as the removable media 711.

The recording medium is offered to users not only as the removable media 711 (shown in FIG. 8) apart from their computer or the like and constituted by magnetic disks (including floppy disks®), optical disks (including CD-ROM (compact disc-read only memory) and DVD (digital versatile disc)), magneto-optical disks (including MD (MiniDisc; Registered Trademark of Sony Corporation)), or semiconductor memory accommodating the programs of interest; but also in the form of the ROM 702 or the hard disk drive in the storage device 708 containing the programs and incorporated beforehand in the computer.

In this specification, the steps describing the programs to be executed represent not only the processes that are to be carried out in the depicted sequence (i.e., on a time series basis) but also processes that may be performed parallelly or individually and not chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. A receiving apparatus for sending received contents to a recording apparatus and for getting said recording apparatus to record the contents in accordance with preset recording reservations, said receiving apparatus comprising:

recording ready time information acquisition means for acquiring from said recording apparatus information about a recording ready time that elapses from the time the recording of one content is ordered to be ended until the recording of another content is ready to be started, said recording ready time information acquisition means acquiring said recording ready time by communicating with said recording apparatus over said network under protocols stipulated by a Universal Plug and Play standard (UPnP), wherein said recording ready time information is defined by UPnP and described by predetermined tags inside device description information held by said recording apparatus;

continuous recording determination means for determining whether two chronologically successive broadcast contents are reserved for recording based on said preset recording reservations; and end time setting means for, if said two chronologically successive broadcast contents are found reserved for recording, setting the time at which to end processing for recording the earlier of the two contents based on a broadcast start time of the latter of the two contents and on the acquired information about said recording ready time.

2. The receiving apparatus according to claim 1, wherein said receiving apparatus stores information for identifying said recording apparatus; and when storing said information for identifying said recording apparatus, said receiving apparatus acquires and stores address information for identifying the location at which is stored said recording ready time information inside said recording apparatus.

3. A receiving method for use with a receiving apparatus for sending received contents to a recording apparatus and for getting said recording apparatus to record the contents in accordance with preset recording reservations, said receiving method comprising the steps of:

acquiring from said recording apparatus information about a recording ready time that elapses from the time the recording of one content is ordered to be ended until the recording of another content is ready to be started, wherein said recording ready time information is defined by a Universal Plug and Play standard (UPnP) and is described by predetermined tags inside device description information;

determining whether two chronologically successive broadcast contents are reserved for recording based on said preset recording reservations; and if said two chronologically successive broadcast contents are found reserved for recording, then setting the time at which to end processing for recording the earlier of the two contents based on a broadcast start time of the latter of the two contents and on the acquired information about said recording ready time.

4. A non-transitory computer readable storage medium containing instructions for causing a processor to function as a receiving apparatus for sending received contents to a recording apparatus and for getting said recording apparatus to record the contents in accordance with preset recording reservations, said receiving apparatus including:

recording ready time information acquisition means for acquiring from said recording apparatus information about a recording ready time that elapses from the time the recording of one content is ordered to be ended until the recording of another content is ready to be started, wherein said recording ready time information is defined by a Universal Plug and Play standard (UPnP) and is described by predetermined tags inside device description information;

continuous recording determination means for determining whether two chronologically successive broadcast contents are reserved for recording based on said preset recording reservations; and end time setting means for, it said two chronologically successive broadcast contents are found reserved for recording, setting the time at which to end processing for recording the earlier of the two contents based on a broadcast start time of the latter of the two contents and on the acquired information about said recording ready time.

5. A recording apparatus for recording received contents sent by a receiving apparatus configured to receive contents, said recording apparatus comprising:

storage means for storing recording ready time information for use by said receiving apparatus preset with two chronologically successive broadcast contents reserved for recording, said recording ready time information allowing said receiving apparatus to set a recording ready time that elapses from the time the recording of the earlier of the two contents is ordered to be ended until the recording of the latter of the two contents is ready to be started, wherein said recording ready time information is defined by a Universal Plug and Play standard (UPnP) and is described by predetermined tags inside device description information; and address information output means for outputting address information onto a network connected with said receiving apparatus, said address information identifying the location at which is stored said recording ready time information inside said storage means.

6. A recording method for use with a recording apparatus for recording received contents sent by a receiving apparatus configured to receive contents, said recording method comprising the steps of:

causing storage means of said recording apparatus to store recording ready time information for use by said receiving apparatus preset with two chronologically successive broadcast contents reserved for recording, said recording ready time information allowing said receiving apparatus to set a recording ready time that elapses from the time the recording of the earlier of the two contents is ordered to be ended until the recording of the latter of the two contents is ready to be started, wherein said recording ready time information is defined by a Universal Plug and Play standard (UPnP) and is described by predetermined tags inside device description information; and outputting address information onto a network connected with said receiving apparatus, said address information identifying the location at which is stored said recording ready time information inside said storage means.

7. A non-transitory computer readable storage medium containing instructions for causing a processor to function as a recording apparatus for recording received contents sent by a receiving apparatus configured to receive contents, said recording apparatus including:

storage means for storing recording ready time information for use by said receiving apparatus preset with two chronologically successive broadcast contents reserved for recording, said recording ready time information allowing said receiving apparatus to set a recording ready time that elapses from the time the recording of the earlier of the two contents is ordered to be ended until the recording of the latter of the two contents is ready to be started, wherein said recording ready time information is defined by a Universal Plug and Play standard (UPnP) and is described by predetermined tags inside device description information; and address information output means for outputting address information onto a network connected with said receiving apparatus, said address information identifying the location at which is stored said recording ready time information inside said storage means.

8. A network system comprising:

a receiving apparatus; and a recording apparatus, said receiving apparatus and said recording apparatus being interconnected via a network, said receiving apparatus receiving contents based on preset recording reservations, said recording apparatus recording the contents received by said recording apparatus;

wherein said receiving apparatus includes recording ready time information acquisition means for acquiring from said recording apparatus information about a recording ready time that elapses from the time the recording of one content is ordered to be ended until the recording of another content is ready to be started, wherein said recording ready time information is defined by a Universal Plug and Play standard (UPnP) and is described by predetermined tags inside device description information, continuous recording determination means for determining whether two chronologically successive broadcast contents are reserved for recording based on said preset recording reservations, and end time setting means for, if said two chronologically successive broadcast contents are found reserved for recording, setting the time at which to end processing for recording the earlier of the two contents based on a broadcast start time of the latter of the two contents and on the acquired information about said recording ready time, and said recording apparatus includes storage means for storing said recording ready time information for use by said receiving apparatus preset with said two chronologically successive broadcast contents reserved for recording, said recording ready time information allowing said receiving apparatus to set said recording ready time that elapses from the time the recording of the earlier of the two contents is ordered to be ended until the recording of the latter of the two contents is ready to be started, and address information output means for outputting address information onto said network connected with said receiving apparatus, said address information identifying the location at which is stored said recording ready time information inside said storage means.

9. A receiving apparatus for sending received contents to a recording apparatus and for getting said recording apparatus to record the contents in accordance with preset recording reservations, said receiving apparatus comprising:

a recording ready time information acquisition section configured to acquire from said recording apparatus information about a recording ready time that elapses from the time the recording of one content is ordered to be ended until the recording of another content is ready to be started, wherein said recording ready time information is defined by a Universal Plug and Play standard (UPnP) and is described by predetermined tags inside device description information;

a continuous recording determination section configured to determine whether two chronologically successive broadcast contents are reserved for recording based on said preset recording reservations; and an end time setting section configured such that if said two chronologically successive broadcast contents are found reserved for recording, then said end time setting section sets the time at which to end processing for recording the earlier of the two contents based on a broadcast start time of the latter of the two contents and on the acquired information about said recording ready time.

10. A recording apparatus for recording received contents sent by a receiving apparatus configured to receive contents, said recording apparatus comprising:

a storage section configured to store recording ready time information for use by said receiving apparatus preset with two chronologically successive broadcast contents reserved for recording, said recording ready time information allowing said receiving apparatus to set a recording ready time that elapses from the time the recording of the earlier of the two contents is ordered to be ended until the recording of the latter of the two contents is ready to be started, wherein said recording ready time information is defined by a Universal Plug and Play standard (UPnP) and is described by predetermined tags inside device description information; and an address information output section configured to output address information onto a network connected with said receiving apparatus, said address information identifying the location at which is stored said recording ready time information inside said storage section.

* * * * *